United States Patent [19]

Kauffman et al.

[11] Patent Number: 5,169,889
[45] Date of Patent: Dec. 8, 1992

[54] POLY HYDROXYBUTYRATE/HYDROXYVALERATE BASED HOT MELT ADHESIVE

[75] Inventors: Thomas Kauffman, Easton; Francis X. Brady, Bethlehem, both of Pa.; Paul P. Puletti, Pittstown; Gary Raykovitz, Flemington, both of N.J.

[73] Assignee: National Starch and Chemical Investment Holding Corporation, Wilmington, Del.

[21] Appl. No.: 826,571

[22] Filed: Jan. 27, 1992

[51] Int. Cl.$^5$ .............................................. C08L 93/04
[52] U.S. Cl. .................................. 524/270; 524/271; 524/272
[58] Field of Search .................... 524/270, 271, 272

[56] References Cited

U.S. PATENT DOCUMENTS

| | | | |
|---|---|---|---|
| 4,477,654 | 10/1984 | Holmes et al. | 528/361 |
| 4,876,331 | 10/1989 | Doi | 528/361 |
| 4,900,299 | 2/1990 | Webb | 604/11 |
| 4,997,909 | 3/1991 | Doi | 528/361 |
| 5,023,081 | 6/1991 | Trai et al. | 424/405 |

OTHER PUBLICATIONS

PHBV TM, *Biodegradable Polyesters;* Natural, Thermoplastic, Biodegradable; Trade literature supplied by ICI Americas Inc., Wilmington, Del.

*Primary Examiner*—Paul R. Michl
*Assistant Examiner*—LaVonda R. DeWitt
*Attorney, Agent, or Firm*—Ellen T. Dec; Edwin M. Szala

[57] ABSTRACT

Hot melt adhesive compositions are prepared from 20 to 90% by weight of a linear polyester of 3-hydroxybutyric and 3-hydroxyvaleric acids containing 9 to 35% of the hydroxyvalerate component; 10 to 80% by weight of a polar tackifier having a Ring and Ball softening (as described by ASTM E-26) greater than about 60° C.; 0 to 50% by weight of a plasticizer; 0 to 30% by weight of a wax diluent and 0-3% by weight of a stabilizer; 0-20% of a compatible polymer. By utilizing a naturally occurring, thermoplastic, biodegradable copolymer as the base polymer, these adhesives advance the state of the art of hot melt adhesives by alleviating the dependence on petroleum based materials and by allowing for the development of hot melt adhesives which either degrade naturally after coming in contact with the soil or which can be composted.

11 Claims, No Drawings

POLY HYDROXYBUTYRATE/HYDROXYVALERATE BASED HOT MELT ADHESIVE

BACKGROUND OF THE INVENTION

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds. Depending on the desired use, the degree of tack of the hot melt adhesives may be varied over a wide range to produce adhesives varying from pressure sensitive to non-pressure sensitive in character. Non-pressure sensitive are used, for example, in bookbinding, bag ending, case and carton sealing. Pressure sensitive hot melts are used in many applications, and particularly in disposables such as diapers, sanitary products and the like, where room temperature tack and long open time are required.

Hot melt adhesives have historically been based on petroleum derived polymers such as polyethylene, ethylene-vinyl acetate, styrenic block copolymers, and polypropylene to name a few. These compositions are further tackified, plasticized, and reinforced with a variety of resins, oils and waxes which are derived from both petroleum and naturally occurring feedstocks such as wood, gum and tall oil rosin and terpenes. These classic compositions suffer from the cyclical price cycles common to all oil derived materials, and also are generally very resistant to degradation once the articles employing them are disposed of.

The present invention stems from the growing movement away from petroleum derived raw materials to those derived from natural resources and as part of an effort to utilize raw materials which have demonstrated some level of degradation. The present invention utilizes a class of naturally occurring, thermoplastic, biodegradable copolymers derived from a non-petroleum feedstock as the base polymer. Such compositions advance the state of the art of hot melt adhesives by alleviating the dependence on petroleum based materials and by allowing for the development of hot melt adhesives which either degrade naturally after coming in contact with the soil or which can be composted.

SUMMARY OF THE INVENTION

It has been discovered that hot melt adhesive compositions suitable for a variety of applications are obtained by use of specific polyhydroxy-butyrate/hydroxy valerate (PHBV) copolymers, tackifiers, and optionally, waxes and/or plasticizers. The adhesives may be formulated using conventional additives and may vary from pressure sensitive to non-pressure sensitive in character depending upon the desired application.

In its broadest aspect, the present invention is directed to hot melt adhesive compositions comprising 20 to 90% by weight of a linear polyester of 3-hydroxybutyric and 3-hydroxyvaleric acids containing 9 to 35% of the hydroxyvalerate component; 10 to 80% by weight of a polar tackifier having a Ring and Ball softening point (as described by ASTM E-26) greater than about 60° C.; 0 to 50% by weight of a plasticizer; 0 to 30% by weight of a wax diluent and 0-3% by weight of a stabilizer.

It will be recognized that the general formulations described above can be adapted to include a wide variety of hot melt adhesive compositions, the more precise formulations of which will vary depending upon the specific end use, the knowledge of which is readily available to those skilled in the particular art.

Thus, in general, adhesives can be prepared using 20 to 70% by weight of the polyhydroxy-butyrate/hydroxyvalerate copolymer containing 9 to 35% of the hydroxyvalerate component, 10 to 60% of a tackifying resin, 10 to 50% plasticizer and 0 to 3% of a stabilizer. Preferred pressure sensitive adhesives are prepared using 40 to 50% of a copolymer containing 24% of the hydroxyvalerate component; 30 to 50% of a tackifying resin, preferably a terpene phenolic resin; and 20 to 30% of a plasticizer, preferably Pycal 94, a phenyl ether of polyethylene glycol from ICI; or Hercolyn D, a methyl ester of hydrogenated rosin from Hercules. Lower levels of plasticizer may also be employed to produce adhesives useful for various end uses such as in construction adhesives for disposable products where some initial degree of tack is needed but no residual pressure sensitive properties are required.

In general, non-pressure sensitive adhesives can be prepared using 20-90% by weight of the polyhydroxybutyrate/hydroxyvalerate copolymer containing 9 to 35% of the hydroxyvalerate component, 10-80% tackifying resin, 0-30% of a wax-like diluent, 0-30% plasticizer and 0 to 3% of a stabilizer. Preferred non-pressure sensitive adhesives are prepared using 50-80% of a copolymer containing 24% of the hydroxyvalerate component; 10-40% tackifying resin, preferably terpene-phenolic resins or rosin derivatives; 0-25% of a plasticizer, preferably the phenyl ether of polyethylene glycol or the methyl ester of hydrogenated wood rosin; 0-20% of a wax-like diluent, preferably hydrogenated castor oil (also known as castor wax) or 12-hydroxystearamide.

Additionally, compatible polymers other than PHBV may be incorporated into the hot melt adhesives at levels less than about 20% by weight. Representative formulations and applications are discussed hereinbelow and illustrated by the examples, however, these should not be construed as limiting the invention.

DETAILED DESCRIPTION OF THE INVENTION

The major component of the adhesive of the invention, present in an amount of 20 to 90% by weight of the adhesive, comprises a linear polyester of 3-hydroxybutyric (HB) and 3-hydroxyvaleric (HV) acids produced from the fermentation of sugars by the bacterium *Alcaligenes eutrophus*. The general structure is shown below:

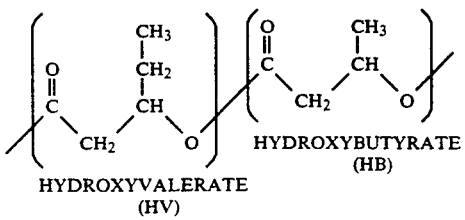

HYDROXYVALERATE (HV)  HYDROXYBUTYRATE (HB)

Polymers suitable for use herein contain 9 to 35% of the hydroxyvalerate component and are available from ICI Americas, Inc. under the Biopol tradename.

The tackifying resins useful in the adhesive compositions are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) phenolic modified terpene resins and hydrogenated derivatives thereof such, for example, as the resin product resulting from the condensation, in an acidic medium, of a bicyclic terpene and a phenol; (4) thermoplastic alkyl phenolic resins such as those described in U.S. Pat. Nos. 4,073,776 and 4,023,826. Mixtures of two or more of the above described tackifying resins, as well as blends of the above resins with small amounts of (e.g., less than about 10% of the adhesive) less compatible resins may be utilized for some formulations. While the tackifier may comprise up to about 80% of the adhesive, it is generally used in amounts of 10 to 60% by weight.

Depending on the end-use application, and particularly for uses requiring pressure sensitive properties, various compatible plasticizing or extending oils may also be present in the composition. Preferred compatible plasticizers include phthalate plasticizers such as dioctyl phthalate; liquid polyesters such as Dynacol 720 from Huls; benzoate plasticizers such as 1,4-cyclohexane dimethanol dibenzoate (e.g., Benzoflex 352 available commercially from Velsicol); phosphate plasticizer such as t-butyl phenyl diphenyl phosphate (e.g., Santicizer 154 available commercially from Monsanto); polyethylene glycols and derivatives thereof such as the phenyl ether of hydrogenated polyethylene glycol (e.g., Pycal 94 available commercially from ICI) as well as liquid rosin derivatives having Ring and Ball melting points below about 60° C. such as the methyl ester of hydrogenated rosin (e.g. Hercolyn from Hercules); as well as vegetable and animal oils such as glyceryl esters of fatty acids and polymerization products thereof.

Other applications conventionally employing adhesives based on these PHBV polymers may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties.

Suitable waxes include 12-hydroxystearamide wax, hydrogenated castor oil, oxidized synthetic waxes, polyethylene oxide having a weight average molecular weight above about 1000 and functionalized synthetic waxes such as carbonyl containing Escomer H101 from Exxon.

It should be recognized that some adhesive formulations described herein may contain both wax and plasticizer components so that the presence of one or the other is not mutually exclusive.

Among the applicable stabilizers or antioxidants which may be included herein are high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythritol tetrakis-3(3,5-di-tert-butyl-4-hydroxyphenyl)-propionate; n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzylphosphonate; 2-(n-octyl-thio)-ethyl 3,5-di-tert-butyl-4-hydroxy-benzoate; and sorbitol hexa[3-(3,5-di-tert-butyl-4-hydroxyphenyl)-propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc. There may also be present in the adhesive small amounts (e.g., less than about 20% by weight, and preferably 5 to 20% by weight) of certain thermoplastic polymers such as ethylene vinyl acetate polymers containing about 12 to 50% vinyl acetate as well as polycaprolactone polymers. These polymers are employed in order to impart flexibility, toughness and strength.

These hot melt adhesive compositions may be formulated using techniques known in the art. An exemplary procedure involves placing approximately 40% of the total tackifying resin concentration with all the polyhydroxybutyrate/hydroxyvalerate copolymer, wax, plasticizers and stabilizers in a jacketed mixing kettle, preferably in a jacketed heavy duty mixer, which is equipped with rotors and thereupon raising the temperature to a range of from up to about 190° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

The adhesives disclosed herein may be employed in a wide variety of uses as are known in the art. The adhesives described herein may be effectively utilized in a variety of packaging and carton sealing applications. The non-pressure sensitive adhesives may also be used to bind a plurality of sheets in a wide range of bookbinding operations. When formulated with plasticizers, the resultant adhesives may be used in the assembly or construction of various disposable applications including, but not limited to, sanitary napkins, disposable diapers, hospital gowns, bed pads and the like. In particular, adhesives are useful for the assembly of disposable articles using multi-line construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrate so as, for example, to impart elongation resistant gathers thereto. The adhesive may also be utilized in less demanding disposable construction applications such as for end or perimeter sealing.

In the following illustrative examples all parts are given by weight and all temperatures in degrees Celsius unless otherwise noted.

EXAMPLE I

In preparing the following samples, a heavy duty mixer which had been heated to 190° C. and which was equipped with a stirring paddle was charged with 40% of the tackifying resin, all the antioxidants and the wax. After melting of the resins and wax, stirring was then initiated whereupon the polyester was added slowly at 190° C. over a one-half hour period after which the temperature was lowered to 150° C. Heating and stirring were continued until a homogeneous mass was obtained whereupon the remainder of the tackifying resin was admixed therewith.

The samples were tested using the following procedures:

Viscosity measurements were determined after 30 minutes using a Brookfield viscometer (spindle 27) at either 160° C. or 163° C.

The adhesive was also subjected to Peel/Shear testing such as is conventionally required in the packaging industry. Peel Temperature Test: A bead of test adhesive approximately ⅛ inch in diameter is applied at 300° to 325° F. with a glass rod onto 60 pound/ream kraft paper. A second sheet of the same paper is placed in direct alignment with the first sheet within 2 seconds and pressed thereto to form a kraft-to-kraft bond. The bonded sheets are then cut perpendicular to the adhesive line into 1 inch wide strips. Duplicate bonded specimens are placed in an oven with one free end of the specimen attached to a fixed support and a 100 gram load suspended from the other free end. The oven temperature is then increased in 10° F. increments at 15 minute intervals. The temperature at which bond delamination occurred is specified as the peel temperature.

Shear Temperature Test: Samples are prepared as in peel temperature test but opposite ends of the bonded specimen are suspended and weighted to stress the bond in a shear mode. The temperature to the oven is increased as in peel test until failure occurs.

The compositions and the results of the testing are shown in Tables 1, 2 and 3.

TABLE 1

|  | 1 | 2 | 3 | 4 | 5 |
|---|---|---|---|---|---|
| Biopol (24% HV content) | 90 | 65 | 80 | 60 | 40 |
| Nirez V-2040 HM | 10 | 35 | 10 | 30 | 60 |
| Escomer H-101 | — | — | 10 | 10 | 0 |
| Irganox 1010 | 1.0 | 1.0 | 1.0 | 1.0 | 1.0 |
| Viscosity @ 163° C. rpm |  |  |  |  |  |
| 5 | 20,650 | 7,750 | 12,800 cps | N/T | 2,250 |
| 10 | 14,00 | 7,125 | 9,075 cps | 400 cps | 2,100 |
| 20 | 9,750 | 6,550 | 6,625 cps | 325 cps | 1,975 |
| 50 | N/T | N/T | N/T | 280 | N/T |
| Adhesion (corrugated) |  |  |  |  |  |
| 22° C. | F.T. | F.T. | F.T. | F.T. | No F.T. |
| 4° C. | F.T. | F.T. | F.T. | F.T. | No F.T. |
| Peel | 52° C. | 71° C. | 52° C. | 60° C. | 54° C. |
| Shear | >110° C. | >110° C. | >110° C. | >110° C. | 54° C. |

Nirez V-2040 HM is a terpene-phenolic resin from Arizona Chemical.
Escomer H-101 is a carbonyl containing functionalized synthetic wax from Exxon.
Irganox 1010 is an hindered phenol antioxidant from Ciba-Geigy.
N/T: Not Tested Table 1 shows four formulations (1–4) suitable for packing applications. The low viscosity of formulation 4 indicates the adhesive would be especially suitable to case and carton seating applications. Formulations 5, prepared using relatively low levels of the Biopol component, while not suitable for packaging due to poor paperboard adhesion, would be useful for various fugitive or temporary bonding applications.

TABLE 2

|  | 6 | 7 | 8 | 9 |
|---|---|---|---|---|
| Biopol (24% HV) | 80 | 60 | 40 | 70 |
| Nirez V-2040 HM | 10 | 30 | 40 | 10 |
| Hydrogenated Castor Oil | 10 | 10 | 20 | 20 |
| Irganox 1010 | 1.0 | 1.0 | 1.0 | 1.0 |
| Viscosity @ 163° C. | 78,500 at 2.5 rpm | 30,200 at 2.5 rpm | 9,350 at 5 rpm | 30,100 at 2.5 rpm |
| Adhesion (Corrugated) |  |  |  |  |
| 22° C. | F.T. | No F.T. | F.T. | F.T. |
| 4° C. | F.T. | No F.T. | No F.T. | F.T. |
| Peel | 49° C. | 54° C. | 93° C. | 46° C. |
| Shear | 132° C. | 132° C. | 132° C. | 62° C. |

The fiber tear and good heat resistance exhibited by formulations 6 and 9 renders these adhesives particularly suitable for bag ending uses while formulation 8 is especially suited for packaging and bag applications where cold adhesion is not critical.

TABLE 3

|  | 10 | 11 | 12 |
|---|---|---|---|
| Biopol (24% HV) | 50 | 50 | 26.7 |
| Nirez V-2040 HM | 30 | 30 | 30 |
| Pycal 94 | 20 | — | 21.7 |
| Hercolyn D | — | 20 | 21.7 |
| Irganox 1010 | 0.1 | 0.1 | 0.1 |
| Viscosity @ 163° C. (20 rpms) | 420 cps | 655 cps | 130 cps |
| Adhesion (corrugated) |  |  |  |
| 22° C. | F.T. | F.T. | F.T. |
| 4° C. | F.T. | F.T. | No F.T. |
| −7° C. | F.T. | F.T. | No F.T. |
| −18° C. | F.T. | F.T. | No F.T. |
| Peel | 31° C. | 54° C. | 21° C. |
| Shear | >116° C. | >116° C. | 91° C. |

Pycal 94 is a phenyl ether of polyethylene glycol from ICI.
Hercolyn D is a methyl ester of hydrogenated rosin from Hercules.

Formulation 11 is ideally suited for packaging and, more specifically, case and carton sealing due to its low viscosity, good fiber tear, and acceptable peel and shear values. Formulation 10, although possessing low viscosity, high shear, and good adhesion (fiber tear), exhibits very low peel value which makes it marginal for packaging applications but suitable for palletizing. Formulation 12, prepared with lower levels of the PHBV polymer, exhibits poorer adhesion and lower peel values which make it undesirable for certain packaging applications.

EXAMPLE II

To demonstrate the utility of the invention in the preparation of plasticized adhesives for disposables, a series of statistically controlled formulations was prepared and tested.

The products made were tested for viscosity at 160° C. and peel strength. The peel strength was measured by extruding a single fine line of adhesive (approximately 4 ms/inch) onto polyethylene at 163° C. at 100 rpm and bonding with nonwoven at 100 psi for 1 second. This was performed on a laboratory bond maker and bonds were aged 24 hours at 22° C., 50% relative humidity.

Bonds were tested by pulling on Instron Tensile Tester at 12"/min in a 180° peel with the polyethylene in the stationary jaw.

Nonwoven/nonwoven bonds were made and evaluated in same manner.

The results are shown in Table 4.

TABLE 4

| Samples | A | B | C | D | E | F |
|---|---|---|---|---|---|---|
| Biopol (24%) | 50 | 27.5 | 10 | 20 | 22.9 | 25 |
| Nirez PRL 300 | 30 | 50 | 75 | 30 | 44.6 | — |
| Hercolyn D | 20 | 22.5 | 15 | 50 | 16.3 | 25 |
| Pycal 94 | — | — | — | — | 16.3 | — |
| Irganox 1010 | 0.1 | 0.1 | 0.1 | 0.1 | 0.1 | 0.1 |
| Sylvatac Rx | — | — | — | — | — | 50 |
| Viscosity at 160° C. (cps) | 655 | 515 | 700 | 200 | 250 | — |
| Peel Strength (grams) | | | | | | |
| Polyethylene/NW | 250 | S.F.* | 40 | S.F.* | S.F.* | S.F.* |
| NW/NW | S.F.* | S.F.* | 11 | S.F.* | S.F.* | S.F.* |

*Substrate Failure
Nirez PRL 300 is a terpene phenolic resin from Arizona Chemical.
Sylvatac Rx is a rosin tackifier from Arizona Chemical.

Samples A, B, C, D and E all demonstrated low viscosity and the required open time, flexibility and wetting to make a substrate destructive bond that is preferred for these disposable applications.

Sample C, containing lower levels of the Biopol component, had a low viscosity but was very brittle and did not make a satisfactory bond for a disposable application.

EXAMPLE III

Based on the test results obtained in Example II, another series of statistically controlled adhesive samples was prepared using a preferred narrow range of components and tested as shown in Table 5.

TABLE 5

| | G | H | J | K | L |
|---|---|---|---|---|---|
| Biopol (24%) | 55 | 40 | 50 | 40 | 40 |
| Nirez PRL 300 | 35 | 40 | 30 | 30 | 50 |
| Hercolyn D | — | — | — | 30 | — |
| Pycal 94 | 10 | 20 | 20 | — | 10 |
| Irganox 1010 | 0.1 | 0.1 | 0.1 | 0.1 | 0.1 |
| Viscosity At 160° C. | 2300 | 1115 | 1555 | 1265 | 1050 |
| 180° Peel (Grams) | | | | | |
| Polyethylene/NW | — | S.F. | — | — | S.F. |
| NW/NW | S.F. | S.F. | S.F. | S.F. | S.F. |

Samples G-K all demonstrated the required bond performance and were higher in viscosity than Samples A-E, but, except for Sample F, the adhesives were still desirably lower in viscosity than most traditional construction adhesives. This reduced viscosity gives an added benefit of applying the adhesive at lower application temperatures, minimizing the heat history of the product, and decreasing the thermal degradation of the PHBV polymer. The lower coating viscosity also allows more temperature sensitive substrates to be used.

EXAMPLE IV

To show that the adhesives of the invention would have acceptable stability at application temperatures of 150° C. or less, a thermal stability test was run on a 200 gram sample in a glass jar at 150° C. and the viscosity after 30 minutes was tested at various line intervals including the initial.

| | |
|---|---|
| Biopol (24%) | 40 |
| Nirez PRL 300 | 50 |
| Hercolyn D | 10 |
| Irganox 1010 | 0.1 |
| Initial Viscosity At 135° C. (cps) | 24,000 |
| Aged Viscosity (cps) at 135° C. | |
| After 8 hours at 150° C. | 26,150 |
| After 12 hours at 150° C. | 27,750 |
| After 16 hours at 150° C. | 22,300 |
| After 24 hours at 150° C. | 15,300 |

This demonstrates that the product has acceptable thermal stability and if the heat history is minimized by lowering application temperatures or using heat on demand systems such as drum unloaders, it will meet processing requirements.

It will be apparent that various changes and modifications may be made in the embodiments of the invention described above, without department from the scope of the invention, as defined in the appended claims, and it is therefore intended that all matter contained in the foregoing description shall be interpreted as illustrative only and not as limitative of the invention.

EXAMPLE V

This example illustrates the use of the PHBV polymers in conjunction with other polymers in the production of useful hot melt adhesives. The components and testing results are shown in Table 6.

TABLE 6

| | M | N | O |
|---|---|---|---|
| Biopol | 60 | 60 | 60 |
| Elvax 40 | 10 | — | — |
| Vinathene 90500 | — | 10 | — |
| Tone 700 | — | — | 10 |
| Nirez 300 | 10 | 10 | 10 |
| Hercolyn D | 20 | 20 | 20 |
| Irganox 1010 | 0.1 | 0.1 | 0.1 |
| Viscosity @ 163° C. | 13,775 cps | 22,050 cps | 88,500 cps |
| Peel | 100° F. | 100° F. | 100° F. |
| Shear | >200° F. | >200° F. | 180° F. |
| Adhesion (corrugated) | | | |
| RT | F.T. | F.T. | F.T. |
| 40° F. | F.T. | F.T. | F.T. |
| Heat Stability (24 hrs/350° F.) | | | |
| Color | Brown | Brown | Brown |
| Char | Very heavy | Very heavy | Very heavy |
| Gel | No | No | No |
| Skin | No | No | No |

Elvax 40 is an ethylene vinyl acetate copolymer containing 40% vinyl acetate available from DuPont.
Vinathene 90500 is an ethylene vinyl acetate copolymer containing 50% vinyl acetate available from Quantum Chemical
Tone 700 is a polycaprolactone polymer available from Union Carbide.

The resulting hot melt adhesives were compatible and well suited for general packaging applications.

EXAMPLE VI

This example illustrates a preferred embodiment of the invention wherein a specific blending procedure is used to produce a workable hot melt adhesive for packaging.

The Biopol, Hercolyn D, and Irganox 1010 were charged to the mixing vessel at 190° C., once melted the temperature was reduced to 163° C. The resin was then added incrementally over about one half hour. Once the resin was all added, the temperature was reduced to 150° C.

TABLE 7

|  | P | Q |
|---|---|---|
| Biopol | 60 | 60 |
| Nirez V-2040 HM | 30 | — |
| Nirez PRL 300 | — | 30 |
| Hercolyn D | 10 | 10 |
| Irganox 1010 | 0.1 | 0.1 |
| Viscosity |  |  |
| @ 163° C. | 1,250 cps | 5,337 cps |
| @ 150° C. | 280,000 cps | 155,000 cps |
| Peel | 140° F. | 130° F. |
| Shear | >200° F. | >200° F. |
| Adhesion (corrugated) |  |  |
| RT | F.T. | F.T. |
| 40° F. | F.T. | F.T. |
| Heat Stability |  |  |
| (24 Hours/300° F.) |  |  |
| Color | Brown | Brown |
| Char | Slight | Slight |
| Gel | No | No |
| Skin | Partial | Partial |

The resulting hot melt adhesives possessed excellent characteristics and were especially suited for case and carton sealing applications.

We claim:

1. A hot melt adhesive composition comprising 20 to 90% by weight of a linear polyester of 3-hydroxybutyric and 3-hydroxyvaleric acids containing 9 to 35% of the hydroxyvalerate component; 10 to 80% by weight of a polar tackifier having a Ring and Ball softening point (as described by ASTM E-26) greater than about 60° C.; 0 to 50% by weight of a plasticizer; 0 to 30% by weight of a wax diluent and 0-3% by weight of a stabilizer; 0-20% of a compatible thermoplastic polymer.

2. The adhesive of claim 1 wherein the tackifying resin is selected from the group consisting of (1) natural and modified rosins; (2) glycerol and pentaerythritol esters of natural and modified rosins; (3) phenolic modified terpene resins and hydrogenated derivatives thereof; (4) thermoplastic alkyl phenolic resins; and mixtures thereof.

3. The adhesive of claim 1 wherein the plasticizer is selected from the group consisting of phthalate plasticizers; liquid polyesters; benzoate plasticizers; phosphate plasticizers; polyethylene glycols and derivatives thereof; and liquid rosin derivatives having Ring and Ball melting points below about 60°.

4. The adhesive of claim 1 wherein the wax is selected from the group consisting of hydroxy stearamide wax, hydrogenated castor oil, oxidized synthetic waxes, polyethylene oxide having a weight average including weight above about 1000 and functionalized synthetic waxes.

5. The adhesive of claim 1 wherein a thermoplastic polymer selected from the group consisting of ethylene vinyl acetate polymers containing 12 to 50% vinyl acetate and polycaprolactone polymer is present in an amount of 5 to 20% by weight.

6. An adhesive composition comprising 20 to 70% by weight of the polyhydroxy-butyrate/hydroxyvalerate copolymer, containing 9 to 35% of the hydroxyvalerate component, 10 to 60% of a tackifying resin and 10 to 50% plasticizer; 0-20% of a compatible polymer.

7. The adhesive of claim 6 comprising 40 to 50% of a polyhyroxybutyrate/hydroxyvalerate copolymer containing 24% of the hydroxyvalerate component; 30 to 50% of a tackifying resin, and 20 to 30% of a plasticizer and 0 to 3% stabilizer.

8. The adhesive of claim 7 wherein the tackifying resin is a terpene phenolic and the plasticizer is a phenyl ether of polyethylene glycol, or a methyl ester of hydrogenated rosin.

9. A non-pressure sensitive adhesive composition comprising 20-90% by weight of a polyhydroxybutyrate/hydroxyvalerate copolymer containing 10-80% tackifying resin, 0-30% of a wax-like diluent, 0-30% plasticizer and 0 to 3% stabilizer; 0-20% of a compatible polymer.

10. The adhesive of claim 9 comprising 50-80% by weight of a copolymer containing 24% of the hydroxyvalerate component; 10-40% tackifying resin; 0-20% waxlike diluent; 0-25% of a plasticizer.

11. The adhesive of claim 10 wherein the tackifying resin is a terpene-phenolic resin or rosin derivative, the plasticizer is a phenyl ether of polyethylene glycol or the methyl ester of hydrogenated wood rosin and the wax diluent is hydrogenated castor oil.

* * * * *